No. 817,814. PATENTED APR. 17, 1906.
K. A. A. STAAHLGREN.
ROTARY ENGINE.
APPLICATION FILED JUNE 1, 1904.
2 SHEETS—SHEET 1.
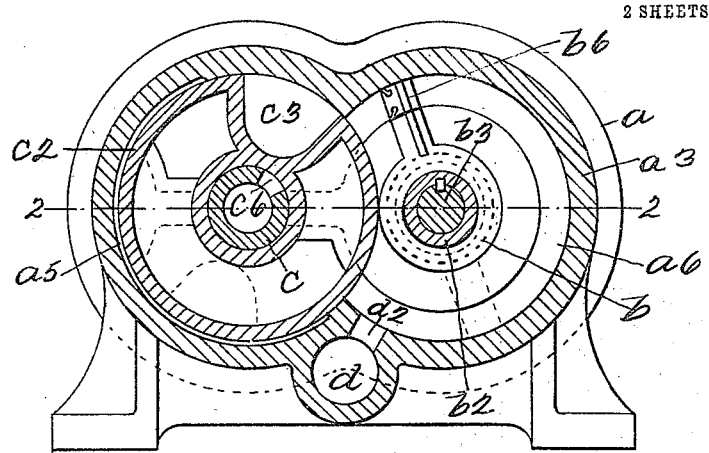
WITNESSES
INVENTOR
Karl A. A. Staahlgren
BY
ATTORNEY No. 817,814. PATENTED APR. 17, 1906.
K. A. A. STAAHLGREN.
ROTARY ENGINE.
APPLICATION FILED JUNE 1, 1904.
2 SHEETS—SHEET 2.
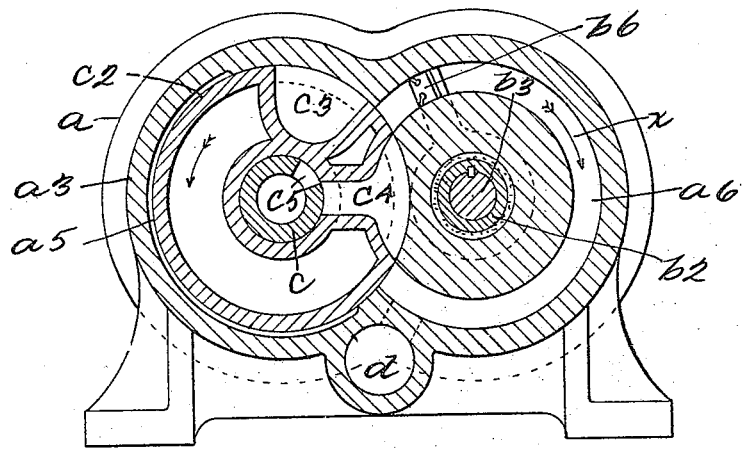
Fig. 3
Fig. 4
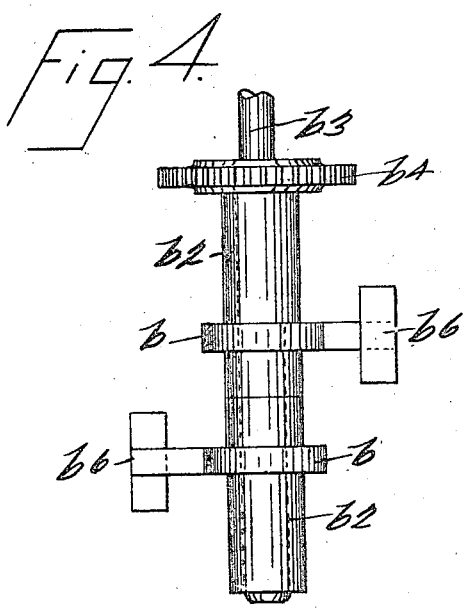
WITNESSES
INVENTOR
Karl A. A. Staahlgren
BY
J. Chris Larsen
ATTORNEY

UNITED STATES PATENT OFFICE.

KARL A. A. STAAHLGREN, OF NEW YORK, N. Y., ASSIGNOR, BY DIRECT AND MESNE ASSIGNMENTS, TO THE ENGINEERING AND DEVELOPMENT COMPANY OF NEW YORK, A CORPORATION OF NEW YORK.

ROTARY ENGINE.

No. 817,814. Specification of Letters Patent. Patented April 17, 1906.

Application filed June 1, 1904. Serial No. 210,634.

*To all whom it may concern:*

Be it known that I, KARL A. A. STAAHLGREN, a subject of the King of Denmark, residing at New York, in the county of New York and State of New York, have invented certain new and useful Improvements in Rotary Engines, of which the following is a specification, such as will enable those skilled in the art to which it appertains to make and use the same.

The object of this invention is to provide a rotary engine which takes advantage of the full expansive force of the steam or other motive fluid, which automatically admits said fluid intermittently to the piston-chamber, and which permits of the positive regulation of the amount of said fluid so admitted, a further object being to provide such an engine which is light, compact, smoothly operative, is composed of few parts, and which provides long bearings for the rotating parts, thereby insuring rigidity and long service, and a further object being to provide an engine of this class which dispenses with external valves and which admits steam through one of said rotating parts.

My invention is fully described in the following specification, of which the accompanying drawings form a part, in which the separate parts thereof are indicated by suitable reference characters in each of the views, and in which—

Figure 1 is a longitudinal vertical section through an engine constructed according to my invention, taken substantially on the line 1 1 of Fig. 2; Fig. 2, a section substantially on the line 2 2 of Fig. 1; Fig. 3, a section on the line 3 3 of Fig. 2 with the parts in the same positions as in Fig. 1, and Fig. 4 a view of the pistons and piston-disks removed from the engine.

In the drawings forming part of this specification I have shown a casing $a$, composed of three members $a^2$, $a^3$, and $a^4$ and within which are two circular chambers $a^5$ and $a^6$, and connected with the member $a^2$ is a plate $a^7$, which serves as a cover for a compartment $a^8$, formed by the member $a^2$.

The chamber $a^5$ is of the same size throughout; but the chamber $a^6$ is enlarged upon its periphery, as shown in Fig. 2, and is duplicated, as shown at $a^9$, by a similar chamber, and the chamber $a^5$ extends slightly beyond the outer edges of the chambers $a^6$ and $a^9$ and intersects them, as shown in Figs. 1 and 3, and in each of the chambers $a^6$ and $a^9$ is a piston-disk $b$, mounted upon and integral with a sleeve $b^2$, which is in turn mounted upon and keyed to a shaft $b^3$, which extends through and beyond the casing $a$ and is provided with a gear-wheel $b^4$ within the compartment $a^8$ and a fly-wheel $b^5$ at its outer end, and upon each of the piston-disks $b$ is mounted a piston $b^6$, preferably opposite each other and which fit closely into the enlarged annular portions of the chambers $a^6$ and $a^9$.

Centrally arranged in the chamber $a^5$ is a tube $c$, which is held in the casing $a$ normally against rotation, and rotatably mounted upon this tube $c$ is an abutment $c^2$, provided with recesses $c^3$ on the surface thereof and oppositely arranged, and also with passages $c^4$, extending from the tube $c$ through the surface of the abutment, as clearly shown in Fig. 3, these passages being narrow and in line with one edge of the corresponding annular portion of the chambers $a^6$ and $a^9$ and with which the passages $c^4$ are adapted to communicate, and the tube $c$ is provided with two ports $c^5$ and $c^6$, which are in line with and adapted to communicate with the corresponding passages $c^4$, and it will be seen that when steam is admitted to the tube $c$ and the abutment rotated said steam is admitted alternately to the annular portions of the chambers $a^6$ and $a^9$.

Secured in the inner end of the tube $c$ is a pin $c^7$, which is held in a jacket $c^8$, fixed to the abutment $c^2$ and rotatable therewith, and to the outer end of the jacket $c^8$ is secured a gear-wheel $c^9$, similar to the gear-wheel $b^4$ and with which it is engaged, and it will be seen that rotation of either the abutment $c^2$ or shaft $b^3$ correspondingly rotates the other thereof.

As will be seen, a slight rotation of the tube $c$ hastens or retards the admission of steam to the passages $c^4$, for the reason that the ports are turned toward or from the direction of rotation of the abutment $c$, and this also affects the amount of steam so admitted, and if the tube $c$ be turned so that the ports thereof are below the center of said tube the steam is admitted to the other ends of the annular portions of the chambers $a^6$ and $a^9$, and the engine is reversed, and various means may be employed to effect this rotation and subsequent securing of the tube c.

Beneath the intersection of the chambers $a^5$ and $a^6$ is an exhaust-passage $d$, communicating with the outer air and with which the annular portions of the chambers $a^6$ and $a^9$ communicate by means of ports $d^2$, which are arranged at the end of the annular chambers opposite to the communication with the passages $c^4$ and in the position of the parts as shown in the drawings. It will be seen that when the motive fluid is admitted to the tube $c$ and the shaft $b^3$ turned slightly in the direction of the arrow $x$ the upper edge of the passage $c^4$ passes the lower edge of the port $c^5$ and the fluid enters the said passage, and at the same time the upper edge of the passage $c^4$ has passed the lower edge of the end of the annular portion of the chamber $a^6$ and the fluid passes thereinto, and this rotation being continued the passage $c^4$ is placed out of communication with both the port $c^5$ and chamber $a^6$ and the fluid already admitted expanding forces the piston $b^6$ through the annular chamber and the shaft $b^3$ is rotated thereby, and after the piston has passed the exhaust-port $d^2$ the fluid has expanded and is exhausted, and the piston continuing its rotary movement enters the recess $c^3$ in the abutment $c^2$, and at this time the other piston $b^6$ is being driven around in the same manner by the fluid admitted to the corresponding annular chamber through the corresponding passage $c^4$ and port $c^6$, and because of the gear-wheels $b^4$ and $c^9$ the recesses $c^3$ and pistons $b^6$ are always in corresponding positions, as are also the passages $c^4$, thereby insuring positive action of my engine.

Various changes in and modifications of the construction herein shown and described may be made within the scope of my invention.

Having fully described the invention, what I claim as new, and desire to secure by Letters Patent, is—

1. In a rotary engine the combination with a piston-chamber and piston therein, an abutment-chamber and rotary abutment therein in geared connection with said piston and having a recess therein to permit the rotation of said piston, and a port leading from the central bore in said abutment to its periphery, said port being out of communication with said recess.

2. In a rotary engine the combination with a revoluble piston and an abutment in geared connection therewith, of a recess in said abutment adapted to receive the piston during a portion of its revolution, and a steam-passage out of communication with said recess leading from the interior of said abutment to its periphery.

3. In a rotary engine the combination with a piston-shaft, of a circular disk secured to said shaft, an arm secured to said disk, a piston secured transversely across the end of said arm, an annular piston-chamber adapted to receive said piston, having a transverse opening to receive said disk and said arm, and an abutment-chamber and abutment therein having its cylindrical surface contact said disk.

4. In a rotary engine the combination with intersecting piston and abutment chambers, of a shaft mounted in said piston-chamber, a disk mounted on said shaft having a piston secured thereto outside of the periphery of said disk, a rotary abutment in said abutment-chamber of uniform external diameter of a size to make contact with said disk, mounted on a hollow shaft adapted to be connected with a source of steam-supply and having a port therein, a passage in said abutment separated from said recess and adapted to communicate with said port to admit steam to said piston.

5. In a rotary engine the combination with intersecting piston and abutment chambers, of a shaft mounted in said piston-chamber, a disk mounted on said shaft having a piston secured thereto outside of the periphery of said disk, a rotary abutment in said abutment-chamber of uniform external diameter of a size to contact with said disk, mounted on a hollow shaft adapted to be connected with a source of steam-supply having a port therein and a passage in said abutment separated from said recess and adapted to communicate with said port to admit steam to said piston, after said recess has passed the intersection of said piston and said abutment chambers.

6. A rotary engine, comprising a casing, an abutment rotatably mounted therein, a piston in operative connection with said abutment and comprising a shaft, a tube thereon, a rim or flange on said tube, an arm on said flange and a plate on said arm and extending on each side thereof and a valve in said abutment for admitting motive fluid to said piston, intermittently, substantially as shown and described.

7. A rotary engine, comprising a casing, an abutment-chamber therein, an abutment in said chamber and provided with oppositely-arranged recesses in the periphery thereof, a piston-chamber, enlarged at its periphery, intersecting said abutment-chamber, a piston therein comprising a shaft, a tube thereon, a web member on said tube, a plate on said web member and of greater dimension, transversely of said engine, than said web, a tube in said abutment and provided with ports, said abutment being also provided with corresponding passages in communication with said piston-chamber and means for operating said abutment when said piston is operated, substantially as shown and described.

8. In a rotary engine, a casing composed of a body, front and rear members, a supplemental casing formed in said rear member, a cover therefor, a circular abutment-chamber in said body member, a plurality of annular piston-chambers formed in said casing, an abutment, a rotating piston in each of said piston-chambers, a shaft about which said pistons rotate, a gear-wheel thereon, a tube upon which said abutment rotates, a passage communicating a port in said tube with the corresponding piston-chamber and a gear-wheel connected with said abutment and engaging said first-named gear-wheel, substantially as shown.

In testimony that I claim the foregoing as my invention I have signed my name, in presence of the subscribing witnesses, this 16th day of May, 1904.

KARL A. A. STAAHLGREN.

Witnesses:
WILLIAM H. JUTSUM,
JOSEPH R. DUNN.